TOGGLE LATCHING REEL COVER WITH A SLIDING DOOR

Filed Sept. 8, 1966 2 Sheets-Sheet 1

INVENTORS
ANTHONY W. ORLANDO
RONALD R. JACOBSEN
STANWOOD W. NUTTER
GEORGE POPP

BY Sughrue, Rothwell, Mion, Zinn & Macpeak
ATTORNEYS

TOGGLE LATCHING REEL COVER WITH A SLIDING DOOR

Filed Sept. 8, 1966 2 Sheets-Sheet 2

United States Patent Office 3,371,882
Patented Mar. 5, 1968

3,371,882
TOGGLE LATCHING REEL COVER WITH A SLIDING DOOR

Anthony W. Orlando, Highland, N.Y., Ronald R. Jacobsen, Golden, Colo., and Stanwood W. Nutter, Poughkeepsie, and George Popp, Pleasant Valley, N.Y., assignors to International Business Machines Corporation, Armonk, N.Y., a corporation of New York Filed Sept. 8, 1966, Ser. No. 577,883
7 Claims. (Cl. 242—55.13)

The present invention is directed to a protective ring or cartridge for a magnetic tape reel which does not interfere with normal use of the reel in a machine. The cartridge is comprised of a flexible ring and channel which can be expanded by a toggle arrangement to permit its attachment to a tape reel. When locked by the toggle, it is clamped over the outer edges of the reel flanges and serves to protect the tape during transportation and storage. The reel and protective ring can be installed on a machine with the protective ring locked in tight clamping relation about the reel flanges. The toggle may then be opened allowing the ring to expand a limited amount to permit free movement of the reel. The action of the toggle also opens a sliding door so that the end of the tape can be fed out of the reel cartridge. In this position, a supply of air is supplied to a central channel having a plurality of air ports to assist in feeding the tape end from the cartridge when the reel is slowly revolved.

In accordance with the present invention, the reel cover or protective ring is always mounted in circumferential relation with respect to the tape reel whether the tape is in storage or mounted in the machine for use. Such a feature lends itself to automatic reel changing since it is not necessary to completely remove the reel cover or protective ring from the reel prior to inserting the reel in the machine. Upon opening of the toggle mechanism the sliding door opens to allow the tape end to be removed and simultaneously aligns the air ports to permit the passage of an air jet into the interior of the protective ring. Such a feature also lends itself to automatic tape threading since air jets will feed the free ends of the tape outwardly through the opening which has been uncovered by the sliding door.

Other features of the invention will be pointed out in the following description and claims and illustrated in the accompanying drawings which disclose by way of example the principles of the invention and the best mode which has been contemplated of applying those principles.

Generally speaking the protective ring or cover for the magnetic tape reels is comprised of a flexible ring and channel which can be expanded by a toggle arrangement to permit its attachment to a tape reel. When locked by the toggle it is clamped over the outer edges of the reel flanges and serves to protect the tape during transportation and storage. The reel in the protective covering can be installed on a machine with the protective cover in place and clamped tightly over the reel flanges. The toggle is then opened and the ring expanded a limited amount to permit free movement of the reel within the protective cover. The action of the toggle also opens a sliding door so that the end of the tape can be fed out of the reel cartridge. In this position a pair of air ports in the ring member and sliding door are aligned to allow a supply of air to be supplied to the central channel for controlled distribution to the circumference of the tape supply to assist in feeding the tape end from the cartridge as the reel is slowly rotated.

Figures 1, 2:
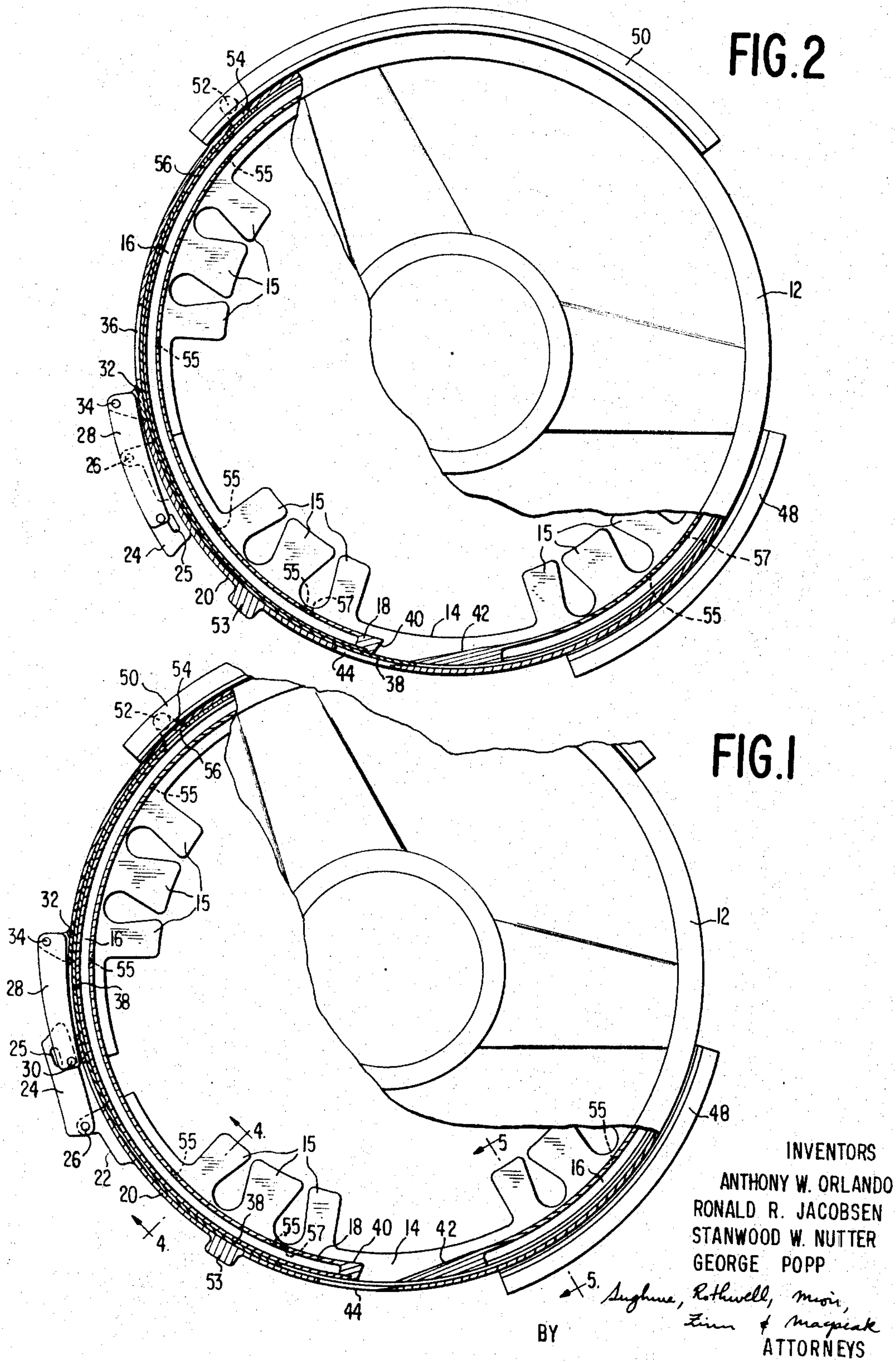
FIG. 1 is a side elevational view partly in section, with the cargo mechanism and sliding door in the open position.
FIG. 2 is a side elevational view, partly in section, of the protective ring with the toggle mechanism and sliding door in a closed position.

More specifically, the protective ring is shown in FIG. 1 in the open position. The protective cover or toggle cartridge consists of an outer ring which is comprised of a U-shaped channel member having an outer circumferential band 10, a short side wall 12 and a longer side wall 14. Note: the side wall 14 is provided with a plurality of inwardly projecting fingers 15 which may be used to provide the additional feature of a document or card holding device. The card may be woven into the openings between the fingers. The channel of the outer ring is directed radially inwardly and receives on the inner surface thereof a second or inner ring 16 which is also U-shaped in cross-section that opens radially outwardly of the toggle cartridge. The inner ring 16 is permanently secured to the outer ring except in the area where the end portion 18 of the inner ring 16 overlaps the end portion 20 of the outer ring 10. In this area of overlap, which extends for approximately 6 inches, the inner ring 16 is not attached to the outer ring 10 to provide for a relative motion between the two rings. The two rings of the cartridge are so formed as to have a spring tension towards the open position wherein the respective ends of the inner and outer rings are biased apart from each other.

A toggle mechanism is utilized to draw the ends of the outer ring together to thereby close the cartridge about a tape reel. A support member 22 is rigidly secured to the end 20 of the outer ring 10 and a finger lever 24 is pivotally mounted on the support 22 by means of pivot pin 26. The lever 24 is provided with an opening 25 which may cooperate with an automatic opening mechanism. A connecting bar 28 is pivotally secured to the finger lever 24 intermediate its ends at 30. The opposite end of the connecting bars 28 is pivotally secured to a slide block 32 at 34. The end of the outer ring opposite the end 20 is formed with a window 36 extending therethrough and the slide block 32 is adapted to reciprocate along the length of the window 36. The slide block 32 is secured to the outer surface of an arcuate sliding door 38 which is adapted to extend for approximately one-quarter of the circumference of the outer ring. The sliding door 38 is adapted to slide circumferentially of the outer ring between the outer ring and the inner ring.

The inner ring 16 is provided with a pair of opposed ends 40 and 42 which are tapered to facilitate the exit of the tape from the reel through the gap between the ends of the inner ring. The outer ring 10 adjacent the ends of the inner ring 40 and 42 is provided with a second window 44 which provides the exit means for the tape from the reel through the outer ring. When the toggle cartridge is in the open position as shown in FIG. 1 the end of the sliding door 38 is disposed adjacent the end 40 of the inner ring 16 thereby providing an open port through which the tape is adapted to pass. When the toggle linkage is shifted in the direction of the arrow marked "closed" as shown in FIG. 3 the ends of the outer ring 10 will be drawn together to a position as shown in FIG. 2 and the sliding door 38 will be shifted to a position overlying the opening formed between the ends 40 and 42 of the inner ring 16.

Figures 3, 4, 5:
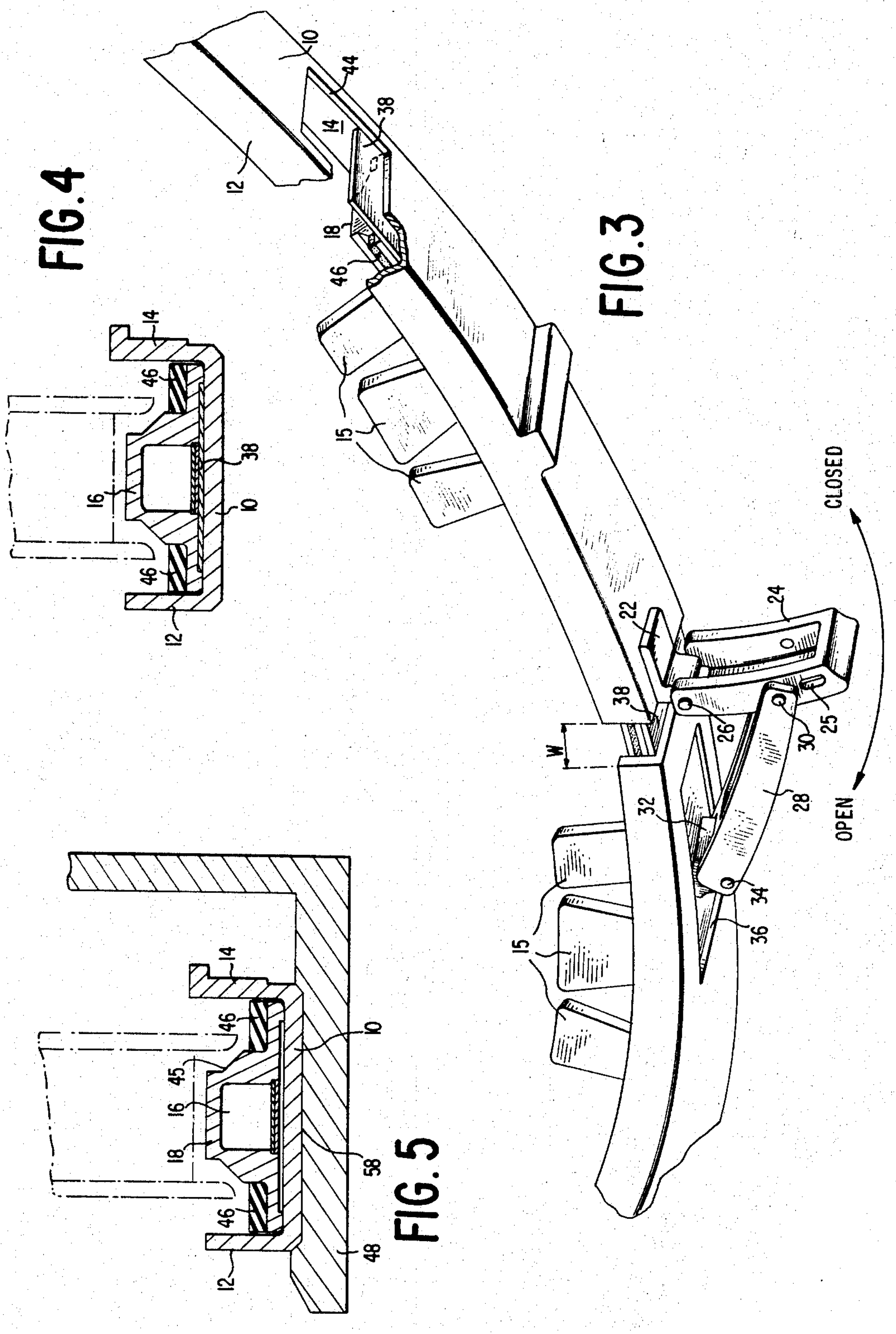
FIG. 3 is a partial perspective view of the protective ring with a toggle mechanism and sliding door in the open position.
FIG. 4 is a sectional view along the line 4—4 in FIG. 1.
FIG. 5 is a sectional view along the line 5—5 in FIG. 1.

As shown in FIG. 4, the width of the inner ring or channel 16 is substantially less than the width of the outer ring or channel 10 and the inner ring 16 is centered between the two sides or flanges 12 and 14 of the outer ring. Rubber seals 46 are disposed in the grooves formed between the inner ring and the flanges 12 and 14. The rubber seals may be glued or secured by any other suitable means to the inwardly directed surface of the outer ring 10. Each of these grooves is adapted to receive a reel flange upon which the toggle cartridge is adapted to be clamped. The inner ring 16 is provided with tapered surfaces 45 complementary to the tapered flanges to aid in centering the cartridge on the reel. When the toggle linkage is shifted to the closed position the circumference of the inner and outer ring members is substantially reduced thereby bringing the rubber seals 46 into tight sealing engagement with the flanges of the reel to completely enclose the tape which is wound on the reel. The reel flanges are solid and may be transparent. As pointed out above, the sliding door has been moved to close the gap between the ends of the inner ring 16 so that the tape will be completely sealed within the reel member.

To mount the reel and toggle cartridge cover on a machine, the machine is generally formed with two spaced restraining members 48 and 50. The restraining member 48 is shown in detail in FIG. 5 and the surface of the restraining member which is adapted to contact the toggle cartridge is formed with a groove 58 adapted to receive the ring 10 therein and hold the cartridge in place when the cartridge is expanded upon movement of the toggle linkage to the open position. The support restrainer 50 is provided with an air port 52 extending radially therethrough. The outer ring of the cartridge 10 is formed with an air port 54 which is adapted to communicate with the air port 52. The sliding door 38 is also provided with an air port 56 extending therethrough and when the toggle linkage is shifted to the open position and the sliding door is retracted to uncover the window 44 in the outer ring 10 the ports 52, 54 and 56 will all be in fluid communication thereby enabling a source of air under pressure to be connected to the port 52 and supply air to the interior of the hollow channel formed by the inner ring 16.

In operation the cartridge containing the supply reel is placed on the machine by inserting the cartridge within the restrainers 48 and 50. Alignment key 53 is provided on the outer ring 10 to enable the cartridge to be located in the proper angular position relative to the support restrainer to enable the ports 52 and 54 to be properly aligned. The reel may then be locked to a drive hub which is not shown and the toggle arm may be lifted from the closed position (FIG. 2) to the operating position (toggle locked) (FIG. 1). The spring tension of the rings causes the outer ring 10 to expand the amount permitted by restrainers. The air ring will move relative to the outer ring until the end 42 of the inner ring is coincident with the end of the window 44 as shown in FIG. 1. This expansion of the rings moves the rubber seal away from the flanges of the reel thereby allowing the reel to move freely inside the cartridge or protective cover.

The expansion will bring the outer ring into contact with the grooves in the restrainers 48 and 50, which will properly align the cartridge and prevent further expansion.

As the toggle arm is moved from the closed locked position to the open locked position, the sliding block will be shifted within the window 36. Since the slide block 32 is rigidly secured to the sliding door 38 the sliding door will move in its slot between the inner and outer rings. With the cartridge expanded into engagement with the restrainers and the toggle locked in the open position, the window 44 in the outer ring through which the tape comes out is opened and the air port 54 in the outer ring is aligned with the port 56 in the sliding door. Air is then introduced into the cartridge through the air ports 52, 54 and 56. The flow of air through the channel 16 is directed radially inwardly through the air jet holes 55 and 57. The holes 55 are tangentially angled with respect to the circumference of the reel such that the jets of air flowing therethrough create a clockwise flow of air about the periphery of the tape wound on the reel. Such a clockwise flow of air aids in transporting the free end of the tape about the inner periphery of the cartridge as the reel is rotated in a clockwise direction as viewed in FIG. 1. The holes 57 are angled tangentially in the opposite direction with respect to the circumference of the reel and direct a jet of air in a counterclockwise direction onto the periphery of the tape wound on the reel to cause the free end of the tape to be peeled off from the supply of wound tape.

Therefore, as the reel is rotated, the free end of the tape will be transported about the interior of the cartridge. Prior to reaching the opening 44, the free end of the tape will be peeled off or separated from the wound supply of tape and upon reaching the opening 44, the free end of the tape will be directed outwardly therethrough.

To close the cartridge the toggle arm 24 is moved back to the closed position and reverse operation of the opening is facilitated. When the cartridge with the reel therein has been removed from the machine and it is desired to remove the reel from the cartridge it is only necessary to move the toggle lever to the open position thereby causing the rings 16 and 10 to expand due to their own inherent resiliency. Since there are no flanges to restrict the expansion of the rings, the rings will expand until held from further movement by the toggle latch. When in this condition the reel may be removed from the cartridge.

Obviously many modifications and variations of the present invention are possible in the light of the above teachings. It is, therefore, to be understood that within the scope of the appended claims the invention may be practiced otherwise than as specifically described.

What is claimed is:

1. A protective cover for a tape reel having flanges comprising an expandable split-ring member adapted to surround the outer circumference of the flanges, toggle means secured to the ends of said split-ring member adapted to draw the ends of said ring member together to clamp the ring member on the circumference of said flanges, tape passage means formed in said ring adjacent one end thereof, movable door means secured to said ring and adapted to be moved into open and closed positions with respect to said passage means, and pneumatic means for transporting the end of the tape through said door means in said open position.

2. A protective cover according to claim 1 further comprising means connecting said toggle means and said movable door means together whereby movement of said toggle means to clamp said ring on said reel will move said door to said closed position and movement of said toggle means to release said ring from said reel will move said door to said open position.

3. A protective cover according to claim 1 wherein said pneumatic means comprises a hollow channel means secured to the inner circumference of said protective ring and adapted to be disposed between the flanges of a reel member enclosed by said protective cover, and air port means extending through said split-ring and said movable door means, which are adapted to be aligned when said door means is moved to said open position to permit air to be admitted into said hollow channel member from external air supply means mounted on a tape handling machine.

4. A protective cover according to claim 3 wherein said hollow channel terminates adjacent said passage means and a plurality of first air jet holes are provided in said channel, directed substantially tangentially with respect to the inner circumference of said channel whereby a flow of air is adapted to be directed about the circumferences of said tape reel to aid in transporting the free end of a tape on said reel in the direction of rotation of said reel.

5. A protective cover according to claim 4 wherein said hollow channel is provided with a plurality of second air jet holes directed substantially tangentially with respect to the inner circumference of said channel and opposite to said first holes, to aid in separating the free end of a tape on said reel from a tape supply on said reel to direct said free end outwardly through said passage means as the reel is rotated within the protective cover.

6. A protective cover according to claim 3 further comprising alignment means adapted to properly position the protective cover with respect to a tape handling machine so that said ports will be properly located with respect to said air supply means to receive air therefrom.

7. A protective cover according to claim 2 wherein said toggle means is so constructed and arranged that said toggle means is locked in a first position when said ring member is clamped on said flanges and is locked in a second position where said ring member is partially expanded to permit rotation of said reel while restraining said ring about said reel flanges and when said ring is fully expanded to permit said ring to be removed from said reel flanges.

References Cited

UNITED STATES PATENTS

| | | | |
|---|---|---|---|
| 2,191,849 | 2/1940 | Debrie | 242—71.1 |
| 3,251,462 | 5/1966 | Hultgren | 206—52 |
| 3,334,831 | 8/1967 | Bradt | 242—55.13 |

GEORGE F. MAUTZ, *Primary Examiner.*